US010427042B2

United States Patent
Bond et al.

(10) Patent No.: US 10,427,042 B2
(45) Date of Patent: *Oct. 1, 2019

(54) PLAYER BIOFEEDBACK FOR DYNAMICALLY CONTROLLING A VIDEO GAME STATE

(71) Applicant: VALVE CORPORATION, Bellevue, WA (US)

(72) Inventors: Steven J. Bond, Issaquah, WA (US); Michael S. Ambinder, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,625

(22) Filed: Dec. 5, 2016

(65) Prior Publication Data

US 2017/0080339 A1    Mar. 23, 2017

Related U.S. Application Data

(63) Continuation of application No. 12/501,284, filed on Jul. 10, 2009, now Pat. No. 9,511,289.

(51) Int. Cl.
*A63F 13/212*    (2014.01)
*A63F 13/42*     (2014.01)
(Continued)

(52) U.S. Cl.
CPC ............ *A63F 13/42* (2014.09); *A63F 13/212* (2014.09); *A63F 13/63* (2014.09); *A63F 13/65* (2014.09);
(Continued)

(58) Field of Classification Search
CPC .......... A63F 13/06; A63F 13/10; A63F 13/12; A63F 2300/69; A63F 2300/1012
(Continued)

(56) References Cited

U.S. PATENT DOCUMENTS

| 5,676,138 A | 10/1997 | Zawilinski |
| 6,097,981 A * | 8/2000 | Freer ...................... G09B 19/00 600/544 |

(Continued)

FOREIGN PATENT DOCUMENTS

WO    WO 2006-034571 A1    4/2006

OTHER PUBLICATIONS

Dekker et al., "Please Biofeed the Zombies: Enhancing the Gameplay and Display of a Horror Game Using Biofeedback", Proc. of DiGRA, 2007.

(Continued)

*Primary Examiner* — Omkar A Deodhar
*Assistant Examiner* — Ross A Williams
(74) *Attorney, Agent, or Firm* — Seed IP Law Group LLP

(57) ABSTRACT

Various embodiments are directed towards employing one or more physical sensors arranged on or in proximity to a video game player to obtain biofeedback measures that are then useable to dynamically modify a state of play of a video game. The sensors may be connected or even un-connected to the game player, replace, or otherwise augment traditional physical game controllers. The sensors gather various biofeedback measures and provide such measures to a biofeedback application programming interface (API). Before and/or during video game play, the video game queries the biofeedback API to request inferences about the game player's state of arousal. The response to the query is then used to modify the state of the video game play. Where the video game is a multi-player video game, biofeedback measures from other game players may also be obtained and used to further modify the state of the video game play.

34 Claims, 8 Drawing Sheets

(51) Int. Cl.
*A63F 13/65* (2014.01)
*A63F 13/63* (2014.01)

(52) U.S. Cl.
CPC ... *A63F 2300/1012* (2013.01); *A63F 2300/69* (2013.01)

(58) Field of Classification Search
USPC .................................... 463/31, 36, 46, 47
See application file for complete search history.

(56) References Cited

U.S. PATENT DOCUMENTS

| | | | |
|---|---|---|---|
| 6,450,820 B1* | 9/2002 | Palsson | G09B 19/22 434/236 |
| 2004/0229685 A1* | 11/2004 | Smith | A63F 13/10 463/29 |
| 2006/0211493 A1 | 9/2006 | Walker et al. | |
| 2007/0207858 A1 | 9/2007 | Breving | |
| 2008/0081692 A1 | 4/2008 | Pope et al. | |
| 2008/0214902 A1 | 9/2008 | Lee et al. | |
| 2008/0214903 A1 | 9/2008 | Orbach | |
| 2008/0318673 A1* | 12/2008 | Rofougaran | A63F 13/235 463/29 |
| 2009/0270170 A1 | 10/2009 | Patton | |
| 2010/0249494 A1 | 9/2010 | Yoshizawa et al. | |

OTHER PUBLICATIONS

Gilleade et al., Affective Videogames and Modes of Affective Gaming: Assist Me, Challenge Me, Emote Me. 2005.

Fallon, S., "The Mindflex Brainwave Game Gives Me a Headache," Gozmodo.com, Nov. 4, 2009, 3 pages http://gizmodo.com/5396971/the-mindflex-brainwave-game-gives-me-a-headache accessed Sep. 20, 2011.

Wii—Wikipedia, http://wikipedia.org/w/index.php?title=Wii&printable=yes, accessed Jun. 9, 2009, 21 pgs.

* cited by examiner

DeterminePlayerArousal()
DeterminePlayerEmotion()
IsHappy()
IsSad()
IsFrustrated()
IsEnergized()
IsEngaged()
IsBored()
IsRelaxed()
IsZoning()
IsPlayerAnticipating() (SCL secondary spikes)
IsPlayerStartled()
WasPlayerStartled()
DetermineHeartRateTrend()
DetermineSCLTrend()
DetermineSignalTrend()
CompareCurrentStateToPreviousState()
HasPlayerStateChanged()
ComputePlayerState() (generalized metric)
ComparePlayerStateToTeammate()
ComparePlayerStateToOpponent()
ComparePlayerStateToBaseline()
ComparePlayerStateToPastBenchmark()
ComputeTeamPlayerState()
CompareTeamPlayerStateToOtherTeam()
CompareTeamPlayerStateToBenchmark()
CompareTeamPlayerStateToPastBenchmark()
IsPlayerLying()
IsPlayerInvolvedInGameplay() (paying attention to onscreen events or not)
ComplicatedComparison()
ArbitraryFormula()

*Fig. 6.*

PLAYER BIOFEEDBACK FOR DYNAMICALLY CONTROLLING A VIDEO GAME STATE

This application is a Continuation of application Ser. No. 12/501,284, filed Jul. 10, 2009, the entirety of which is incorporated herein by reference.

TECHNICAL FIELD

The present invention relates generally to interactive video games and more particularly, but not exclusively, to using biofeedback from a game player to modify a video game state.

BACKGROUND

Today, the computer gaming industry is a multi-billion dollar industry. Such popularity may be due in part to faster computing devices, higher quality graphics, and better quality games. Many of today's video games provide a variety of different input/output devices useable by a game player to interact with the game. For example, many video games allow a player to interact using a keyboard and/or mouse. While such input/output controllers allow the game player to interact with the game, the game player might not 'feel' that they are immersed into the game. Therefore, many video games have been redesigned to allow use of gamepads, joysticks, trackballs, game paddles, and the like to provide ways of immersing the video game player. Some joysticks and/or paddles are configured to resemble a type of device consistent with the video game being played. For example, for some flight simulation games, a joystick might be designed to provide throttle quadrants, levels, wheels, and handheld sticks that appear to the game player as though they are flying within a cockpit of an aircraft.

By modifying the input devices, video game players are more likely to become involved with and therefore, enjoy the video game more so. As such, the video game player is more likely to continue to play the game, share the game with others, and perhaps to purchase similar games in the future. This trend of modifying the input devices to have more game player involvement is even more apparent with the advent of wireless controllers. For example, in one popular video game, the game input controller is a wireless handheld controller that may include built-in accelerometers, infrared detectors, or similar components. Such components are used to sense a position of the controller in three-dimensional space when pointed at a light emitting diode (LED) within a remote sensor bar. The game player then controls the game using physical gestures as well as traditional buttons, to play games such as bowling, imaginary musical instruments, boxing games, or the like.

However, while many game players may feel this provides an increased level of involvement in the video game, other game players may still feel that the involvement in the video game is incomplete. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein:

FIG. 6 illustrates one embodiment of a non-exhaustive, non-limiting example of queries for use in querying a biofeedback application programming interface (API) for biofeedback measures;

DETAILED DESCRIPTION

Figure 1:
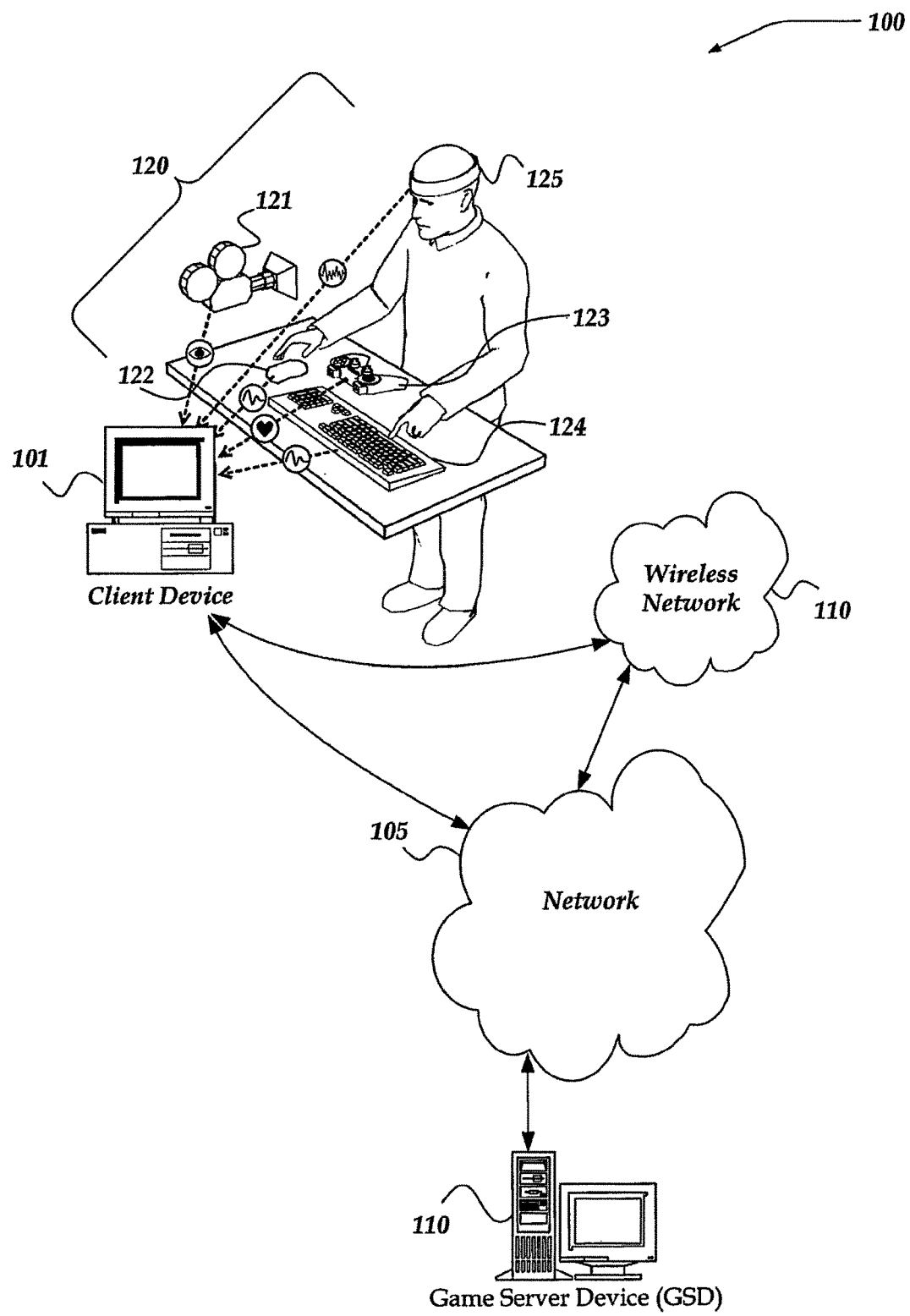
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "biofeedback," and "physiological" refer to measures of a game player's specific and quantifiable bodily functions. Such biofeedback measures are typically also referred to as measurements of unconscious or involuntary bodily functions. Such biofeedback measures may include, but are not limited to blood pressure, heart rates, eye movements, pupil dilations, skin temperatures, sweat gland activity, muscle tensions, and similar bodily functions. As described further herein, such measures are useable to make inferences about the game player's state of arousal or emotional state. It is noted that a state of arousal includes not only an emotional state, but a physiological state as well. Moreover, as used herein, a state of arousal further includes determination of engagement, valence, and/or other user states based on physiological measurements.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards employing one or more physical sensors arranged on or in proximity to a video game player to obtain biofeedback measures about the game player that is useable to dynamically modify a state of play of the video game. In one embodiment, the modifications may be performed substantially in real-time. In another embodiment, the modifications may be performed for use in a subsequent game play. The physical sensors may be connected to the game player, replace, and/or otherwise augment traditional physical game controllers. In another embodiment, the physical sensors need not be connected to the game player and may instead be located in proximity to the game player. Non-limiting examples of such physically un-connected sensors include a video camera, weight/position sensor pads upon which the game player might stand upon, or the like. The sensors are arranged to gather various biofeedback measures such as heart activity, galvanic skin responses, body temperatures, eye movements, head or other body movements, or the like, and to provide such measures to a biofeedback application programming interface (API). Before and/or during a video game play, the video game may query the biofeedback API for an inference about the game player's state of arousal, emotional state, or the like, as described further below based on the biofeedback measures. Then, based on the response to the query, the video game modifies a state of video game play. In this manner, the video game may determine whether the game player's current physiological state is consistent with a type and/or level of experience the video game may seek to provide. For example, if the game player's stress or arousal state is determined to be above a given threshold, the video game may modify the state of the game play to provide the game player an opportunity to relax and/or recover. In another embodiment, where the game player's stress or arousal state is determined to be below another threshold, the video game may modify the state of the game play to provide an increased level of excitement for the game player.

In one embodiment, the threshold may be based on historical biofeedback measures and/or inferences about the particular game player. In another embodiment, the threshold may be based on analysis of the particular game player for the current video game play. In still another embodiment, the threshold may be based on statistical analysis of a plurality of game players.

In one embodiment, where the video game is configured as a multi-player video game, biofeedback measures from other game players may also be obtained and used to further modify a state of the video game play.

Illustrative Operating Environment

FIG. 1 illustrates a block diagram generally showing an overview of one embodiment of a system in which the present invention may be practiced. System 100 may include many more components than those shown in FIG. 1. However, the components shown are sufficient to disclose an illustrative embodiment for practicing the present invention. As shown in the figure, system 100 includes local area networks ("LANs")/wide area networks ("WANs")-(network) 105, wireless network 110, client device 101, game server device (GSD) 110, and biofeedback sensors 120.

One embodiment of a client device usable as client device 101 is described in more detail below in conjunction with FIG. 2. Briefly, however, client device 101 may include virtually any mobile computing device capable of receiving and sending a message over a network, such as network 110, or the like. Such devices include portable devices such as, radio frequency (RF) devices, infrared (IR) devices, Personal Digital Assistants (PDAs), game consoles, handheld computers, laptop computers, wearable computers, tablet computers, integrated devices combining one or more of the preceding devices, or the like. Client device 101 may also include virtually any computing device that typically connects using a wired communications medium, such as network 105, such as personal computers, multiprocessor systems, microprocessor-based or programmable consumer electronics, network PCs, or the like. Thus, in one embodiment, client device 101 may be configured to operate over a wired and/or a wireless network.

Client device 101 typically range widely in terms of capabilities and features. For example, a handheld device may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client device 101 also may include at least one application that is configured to receive content from another computing device. The application may include a capability to provide and receive textual content, multimedia information, components to a computer application, such as a video game, or the like. The application may further provide information that identifies itself, including a type, capability, name, or the like. In one embodiment, client device 101 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client device 101 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed. Thus, in one embodiment, client device 101 may enable users to participate in one or more messaging sessions, such as a chat session, a gaming session with messaging, or the like. Such messaging sessions may be text oriented, in that the communications are achieved using text. However, other messaging sessions may occur using client device 101 that employ other mechanisms to communicate, include, but not limited to audio, graphics, video, and/or a combination of text, audio, graphics, and/or video.

Client device 101 may be configured to receive messages, images, and/or other biofeedback measures, from various biofeedback sensors 120. Illustrated in FIG. 1 are non-limiting, non-exhaustive examples of possible physical biofeedback sensors 120 that may be connected or unconnected to the user, replace, and/or otherwise augment traditional physical game controllers. Thus, as illustrated biofeedback sensors 120 may be integrated within a game controller (sensor 123), one or more keys, wheels, or the like, on a keyboard (sensor 124). In one embodiment, the game controller may include modular and/or pluggable components that may include modular and/or pluggable sensors (123).

Similarly, biofeedback sensors 120 may include a camera 121, a touch pad 122, or even a head device 125. However, as noted, other biofeedback sensors 120 may also be employed, including, eyeglasses, wrist bands, finger sensor attachments, sensors integrated within or on a computer mice, microphones for measuring various voice patterns, or the like. Thus, it should be apparent to one skilled in the art that various embodiments may employ virtually any mechanism configurable to obtain biofeedback measures of the game player.

The biofeedback sensors 120 may be arranged to gather various measures of a game player before, after, and/or during a video game play. Such measures include, but are not limited to heart rate and/or heart rate variability; galvanic skin responses; body temperature; eye movement; head, face, hand, or other body movement, gestures, positions, facial expressions, postures, or the like. Additionally, biofeedback sensors 120 may collect other measures, including, blood oxygen levels, other forms of skin conductance levels, respiration rate, skin tension, voice stress levels, voice recognition, blood pressure, Electroencephalography (EEG) measures, Electromyography (EMG) measures, response times, or the like.

Biofeedback sensors 120 may provide the measures to client device 101. In one embodiment, the measures may be provided to client device 101 over any of a variety of wired and/or wireless connections. Thus, biofeedback measures may be communicated over various cables, wires, or the like, with which other information may also be communicated for a game play. For example, biofeedback measures might be transmitted over a USB cable, coaxial cable, or the like, with which a mouse, keyboard, game controller, or the like, is also coupled to client device 101. However, in another embodiment, a distinct wired connection may be employed. Similarly, biofeedback sensors 120 may employ various wireless connections to communicate biofeedback measures. In addition, any of a variety of communication protocols may be used to communicate the measures. Thus, the invention is not to be construed as being limited to a particular wired or wireless communication mechanism and/or communication protocol.

In one embodiment, client device 101 may include a biofeedback device interface (BFI) that is configured to determine whether one or more physical sensors 120 are operational, and to manage receipt of biofeedback measures from physical sensors 120. One embodiment of a BFI is described in more detail below in conjunction with FIG. 2. Briefly, however, the BFI may further timestamp the received biofeedback measures, buffer at least some of the measures, and/or forward the measures to GSD 110 for use in modifying a state of a video game play. Buffering of the received biofeedback measures may enable the BFI to perform quality analysis upon the received measures, and to provide alert messages based on a result of the analysis.

Wireless network 110 is configured to couple client device 101 with network 105. Wireless network 110 may include any of a variety of wireless sub-networks that may further overlay stand-alone ad-hoc networks, or the like, to provide an infrastructure-oriented connection for client device 101. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client device 101 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client device 101 and another computing device, network, or the like.

Network 105 is configured to couple computing devices, such as GSD 110 to other computing devices, including potentially through wireless network 110 to client device 101. However, as illustrated, client device 101 may also be connected through network 105 to GSD 110. In any event, network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

One embodiment of GSD 110 is described in more detail below in conjunction with FIG. 3. Briefly, however, GSD 110 may include any computing device capable of connecting to network 105 to enable a user to participate in one or more online games, including, but not limited multi-player games, as well as single player games. Thus, while FIG. 1 illustrates a single client device 101 with biofeedback sensors 120, the invention is not so limited, and a plurality of similar client devices with biofeedback sensors may be deployed within system 100.

Therefore, GSD 110 is configured to receive various biofeedback measures from one or more game players and to employ the received measures to modify a state of the video game. GSD 110 may employ the biofeedback to dynamically adjust a game play difficulty, and/or other aspects of a video game based on the biofeedback measures. For example, in one embodiment, if it is determined that a user is experiencing a level of stress defined as excessive, based on a threshold, the video game within GSD 110 might provide a different game play to enable reduction in the determined stress level.

GSD 110 may also enable the video game to provide a unique experience each time it is played based on the biofeedback measures of the game player. For example, in one embodiment, a color of an object, size, shape, and/or action of a game character, or the like, may be adjusted based on biofeedback measures. That is various aspects of a background displayed within the background of the game may be modified based on the results of an analysis of the biofeedback measures.

In one embodiment, historical measurements may be stored, and analyzed to enable GSD 110 to detect a particular game player. Such stored measurements may then be used to personalize the game play for the particular game player, identify changes in a game play by the particular game player based on a determined trend determination, or the like. In one embodiment, historical measurements together with analysis of the biofeedback measures may be used to determine whether the game player is currently associated with a prior user profile—that is, is this game player someone that has played before? GSD 110 may also adjust a type of game play offered based a determination of the game player's level of engagement during a game play, historical patterns, or the like.

GSD 110 may further provide matchmaking decisions based in whole or in part on a physiological or emotional state of a game player that may seek a multiplayer game session. In still other embodiments, GSD 110 may dynamically adjust game play instructions, tutorials, or the like, based on the received biofeedback measures. For example, where it might be determined that the game player is determined to be bored or otherwise uninterested in the instructions, tutorials, or the like, GSD 110 might enable the material to be sped up, skipped or the like.

GSD 110 is not limited to these examples of how biofeedback measures may be used however, and others ways of employing the biofeedback measures to modify a game play state may also be used. For example, the biofeedback measures may be employed to directly control an aspect of the game play. One non-limiting example of such is described in more detail below in conjunction with FIG. 8.

In still other embodiments, GSD 110 may depict the game player's emotional, physiological state and/or other aspects of the game player's expression within a game character. For example, a game player's avatar might be modified to display a heart that beats at the rate of the game player's heart, or the avatar might be shown to breathe at the game player's rate, or sweat, or even show a facial expression, or body position based on the received biofeedback measures for the game player. Thus, GSD 110 may employ biofeedback measures in any of a variety of ways to modify a state of a game play.

Devices that may operate as GSD 110 include personal computers, desktop computers, multiprocessor systems, video game consoles, microprocessor-based or programmable consumer electronics, network PCs, server devices, and the like.

Moreover, although GSD 110 is illustrated as a single network device the invention is not so limited. For example, one or more of the functions associated with GSD 110 may be implemented in a plurality of different network devices, distributed across a peer-to-peer system structure, or the like, without departing from the scope or spirit of the invention. Thus, as described below in conjunction with FIG. 3, is a network device 300 configured to manage a game play using biofeedback measures to modify a state of the game. However, other configurations are also envisaged.

For example, in another embodiment, the client device 101 may be configured to include components from GSD 110 such that client device 101 may operate independent of GSD 110. That is, in one embodiment, client device 101 may include game software with biofeedback, biofeedback Application Programming Interfaces (APIs), and the like, and operate without use of a network connection to GSD 110. Client device 101 may therefore, operate as essentially a standalone game device with interfaces to the biofeedback sensors, and other input/output devices for user enjoyment. Therefore, the invention is not constrained or otherwise limited by the configurations shown in the figures.

Although a single client device 101 is illustrated in FIG. 1 having a single game player and a 'single set' of biofeedback sensors 120, other embodiments are also envisaged. For example, in one embodiment, a plurality of game players, each having their own biofeedback sensors might interact and play together a same video game through the same client device 101. Thus, multi-player configurations may include such variations as multiple game players employing the same or different client devices. Therefore, FIG. 1 is not to be construed as being limited to a single game player configuration.

Illustrative Client Device

Figure 2:
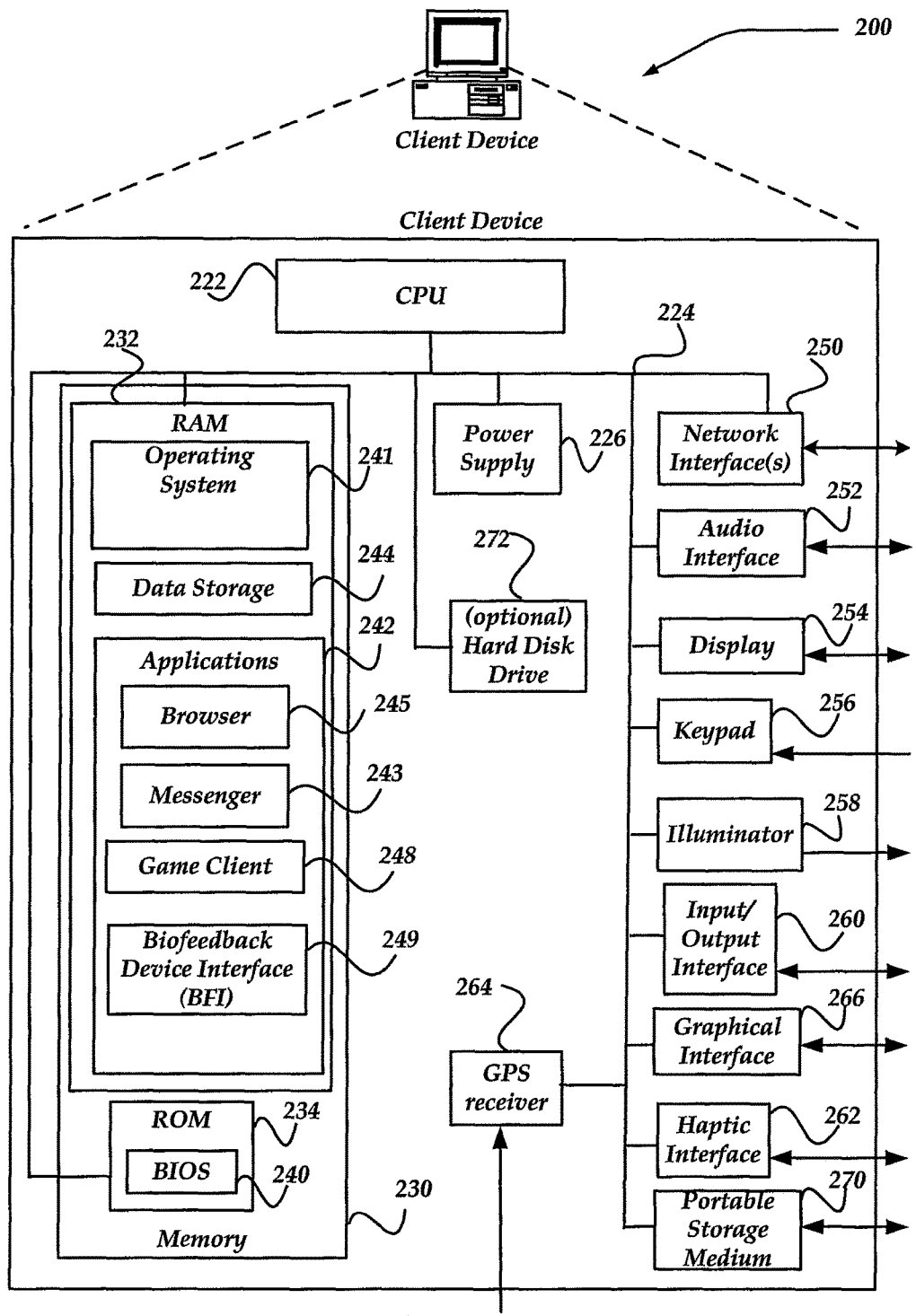
FIG. 2 shows one embodiment of a client device for use in the environment of FIG. 1.

FIG. 2 shows one embodiment of client device 200 that may be included in a system implementing the invention. Client device 200 may include many more or less components than those shown in FIG. 2. For example, client device 200 may be configured with a reduced set of components for use as a standalone video game device. However, the components shown are sufficient to disclose an illustrative embodiment for practicing the present invention. Client device 200 may represent, for example, client device 101 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, and a global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. Client device 200 may also include a graphical interface 266 that may be configured to receive a graphical input, such as through a camera, scanner, or the like.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (Wi-Max), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images, game play, messaging sessions, or the like. In one embodiment, keypad 256 may include various biofeedback sensors arranged to obtain various measures including, but not limited to pressure readings, response time readings, sweat readings, or the like.

Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices, including, but not limited, to joystick, mouse, or the like. As described above in conjunction with FIG. 1, client device 200 may also be configured to communicate with one or more biofeedback sensors through input/output interface 260. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may, through other components, provide other information that may be employed to determine a geo physical location of the device, including for example, a MAC address, IP address, or other network address.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, the Symbian® operating system, or even any of a variety of video game console operating systems. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The capability information may further be provided to another device based on any of a variety of events, including being sent as part of a header during a communication, sent upon request, or the like. Data storage 244 may also be employed to buffer one or more measures received from a biofeedback sensor.

In one embodiment, data storage 244 may also include cookies, portions of a computer application, user preferences, game play data, messaging data, and/or other digital content, and the like. At least a portion of the stored data may also be stored on an optional hard disk drive 272, optional portable storage medium 270, or other storage medium (not shown) within client device 200.

Applications 242 may include computer executable instructions which, when executed by client device 200, transmit, receive, and/or otherwise process messages (e.g., SMS, MMS, IMS, IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, search programs, and so forth. Applications 242 may further include browser 245, messenger 243, game client 248, and biofeedback device interface (BFI) 249.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, VOIP, or the like. For example, in one embodiment, messenger 243 may be configured as an IM application, such as AOL Instant Messenger, Yahoo! Messenger, .NET Messenger Server, ICQ, or the like. In one embodiment, messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. Moreover, messenger 243 might be configured to manage a plurality of messaging sessions concurrently, enabling a user to communicate with a plurality of different other users in different messaging sessions, and/or a same messaging session. As used herein, the term "active messaging session" refers to a messaging session in which a user may communicate with another user independent of having to restart and/or re-establish the messaging session. Thus, maintaining a messaging session as active indicates that the messaging session is established, and has not been terminated, or otherwise, placed into a sleep mode, or other inactive mode, whereby messages may not be actively sent and/or received.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Game client 248 represents a game application component that is configured to enable a user to select one or more games to play, register for access to the one or more games, and/or launch the one or more games for online interactive play. In one embodiment, game client 248 may establish communications over a network with a network device, such as GSD 110, or the like, to enable registration, purchase, access to, and/or play of the one or more computer games.

Game client 248 may receive from a user via various user input devices, including, but not limited to those mentioned above, directions to launch a computer game. Game client 248 may then enable communications of game data between client device 200 and the GSD 110, another client device, or the like.

In one embodiment, game client 248 represents a computer game application; however, game client 248 is not limited to game applications, and may also represent virtually any interactive computer application, or other interactive digital content. Thus, while described herein as employing biofeedback measures to modify a state of a video game play, the invention is not to be construed as being limited to video game play, and states of other applications may also be modified. For example, a presentation, tutorial, or the like, may be modified based on biofeedback measures.

Thus, in one embodiment, game engine 248 represents a client component useable to enable online multi-user game play, and/or single game player use. Non-exhaustive, non-limiting examples of such computer games include but are not limited to Half-Life, Team Fortress, Portal, Counter-Strike, Left 4 Dead, and Day of Defeat developed by Valve Corporation of Bellevue, Wash.

BFI 249 is configured to detect a connection of one or more biofeedback sensors, and to collect measures received from such sensors. In one embodiment, BFI 249 may provide information to a remote network device, and/or to game client 248 indicating that a connection with a biofeedback sensor is detected. BFI 249 may further buffer at least some of the received measures. In another embodiment, BFI 249 may select to instead, provide the received measures to the remote network device, absent buffering, virtually in real-time. In one embodiment, BFI 249 may convert the measures into a format and/or protocol usable to communicate the measures over a network to the remote network device. In another embodiment, BFI 249 may select to not communicate the measures over a network, such as when client device 200 may be configured as a standalone type of video game console. In one embodiment, BFI 249 may also time stamp the received measures such that the measures may be readily correlated. Further, BFI 249 may provide a sensor source identifier to the measures so that measures may be distinguished based on its sensor source.

BFI 249 may further perform one or more analysis on the received measures to determine if a sensor is providing faulty readings, has become disconnected, or the like. Such determinations may be based on a comparison over time of a plurality of received measures for a given sensor to detect changes from an anticipated range of values for a received measure. For example, if BFI 249 detects that the sensor measure is a heart rate sensor, and the measures indicate a heart rate of, for example, 2 beats per minute, or even 100 beats per second, then BFI 249 may determine that the sensor measures are faulty. It should be clear; however, that BFI 249 may employ other range values, and is not constrained to these example range values. Moreover, BFI 249 may employ different range values for different sensors. In one embodiment, BFI 249 might provide the determined faulty measures over the network at least for a given period of time, under an assumption that the game player is temporarily adjusting the sensor. However, in another embodiment, if the sensor is determined to be faulty beyond the given time period, BFI 249 may select to cease transmission of the measures, and/or send a message to the remote network device.

As noted above, in conjunction with FIG. 1, client device 200 may be configured to include components of network device 300 (described below in conjunction with FIG. 3), including biofeedback APIs, game server components, and the like. In such an embodiment, client device 200 might operate essentially as a standalone game console, without communicating with network device 300. In such a configuration, client device 200 may be termed a standalone video game device.

Illustrative Network Device

Figure 3:
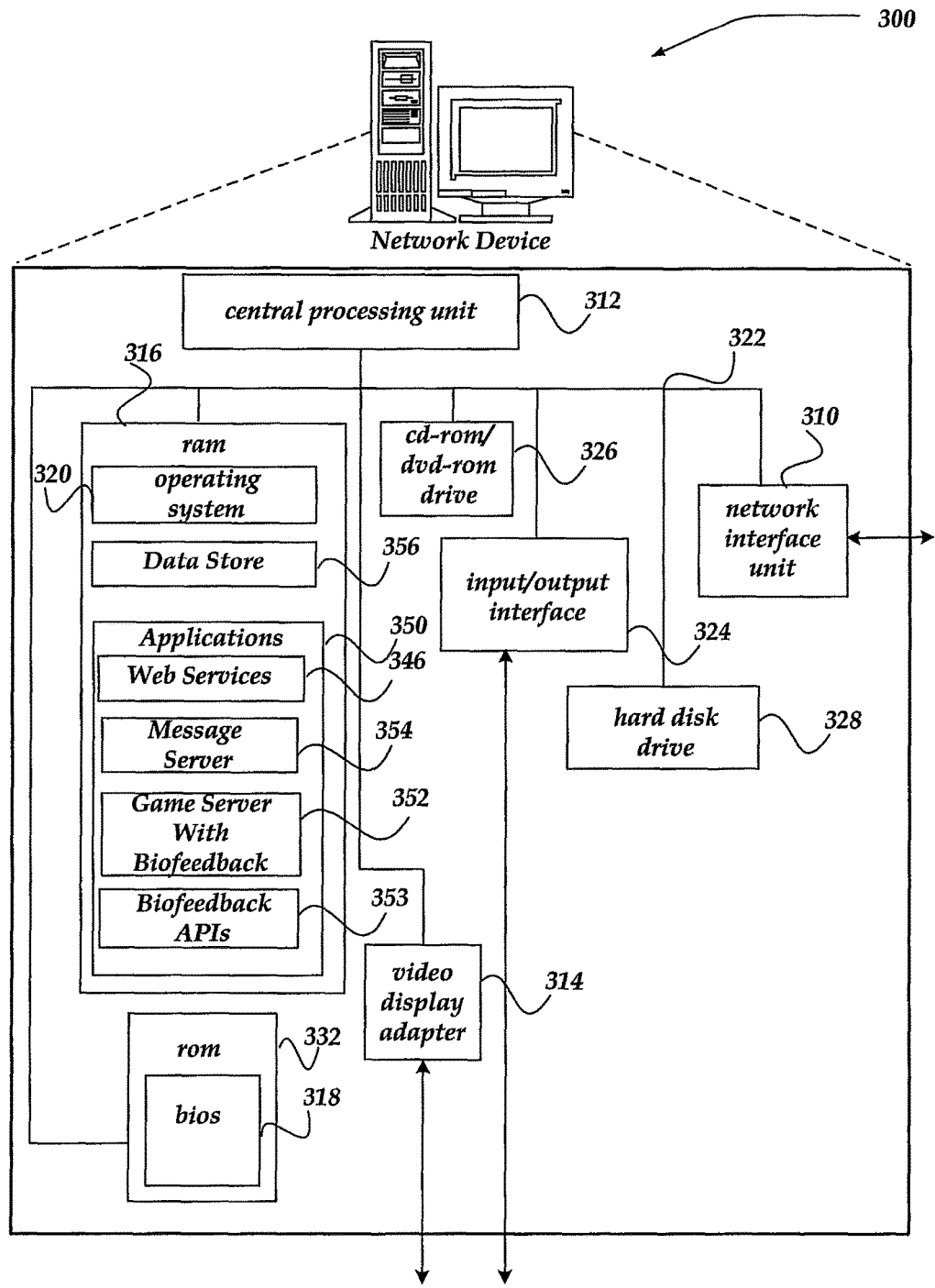
FIG. 3 shows one embodiment of a network device for use in the environment of FIG. 1.

FIG. 3 shows one embodiment of a network device, according to one embodiment of the invention. Network device 300 may include many more or fewer components than those shown. The components shown, however, are sufficient to disclose an illustrative embodiment for practicing the invention. Network device 300 may represent, for example, GSD 110 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. In one embodiment, the mass memory may include data store 356. Data stores 356 includes virtually any component that is configured and arranged to store data including, but not limited to game player preferences, game play state and/or other game play data, messaging data, biofeedback measures, and the like. Data store 356 also includes virtually any component that is configured and arranged to store and manage digital content, such as computer applications, video games, and the like. As such, data stores 356 may be implemented using a data base, a file, directory, or the like. At least a portion of the stored data may also be stored on hard disk drive 328, a portable device such as cd-rom/dvd-rom drive 326, or even on other storage mediums (not shown) within network device 300 or remotely on yet another network device.

One or more applications 350 are loaded into mass memory and run on operating system 320. Examples of application programs may include transcoders, schedulers, calendars, database programs, word processing programs, HTTP programs, customizable user interface programs, IPSec applications, computer games, encryption programs, security programs, VPN programs, SMS message servers, IM message servers, email servers, account management and so forth. Applications 350 may also include web services 346, message server 354, game server with biofeedback (GSB) 352, and Biofeedback APIs (BAPI) 353.

Web services 346 represent any of a variety of services that are configured to provide content over a network to another computing device. Thus, web services 346 include for example, a web server, messaging server, a File Transfer Protocol (FTP) server, a database server, a content server, or the like. Web services 346 may provide the content over the network using any of a variety of formats, including, but not limited to WAP, HDML, WML, SMGL, HTML, XML, cHTML, xHTML, or the like.

Message server 354 may include virtually any computing component or components configured and arranged to manage messages from message user agents, and/or other message servers, or to deliver messages to a message application, one another network device. Message server 354 is not limited to a particular type of messaging. Thus, message server 354 may provide capability for such messaging services, including, but not limited to email, SMS, MMS, IM, IRC, mIRC, Jabber, VOIP, and/or a combination of one or more messaging services.

GSB 352 is configured to manage delivery and play of a video game using biofeedback information obtained from one or more client devices, such as client device 101 of FIG. 1. Typically, GSB 352 may provide components to an application, such as a game application to the client device over a network. In one embodiment, at least one of the components provided is encrypted using any of a variety of encryption mechanisms. For example, in one embodiment of the invention, Crypto++, an open-source class library of cryptographic techniques, is employed in encrypting or decrypting components of the application. However, virtually any other encryption and decryption mechanism may be used.

GSB 352 may further receive and/or authenticate a request from a client device for access to an application. GSB 352 may provide for purchase of an application, such as a computer game, enable registration for play of the application, and/or enable download access for the application.

GSB 352 may further enable communications between client devices participating in a multi-player application by receiving and/or providing various data, messages, or the like, between the client devices.

GSB 352 may query Biofeedback APIs (BAN) 353 for information about one or more game player's state or arousal, and/or other information about the game player(s). GSB 352 may then modify a state of the video game play based on the received responses to the query. Non-limiting, non-exhaustive examples of queries that GSB 352 might submit to BAPI 353 are described below in conjunction with FIG. 6. Non-limiting, non-exhaustive examples of possible ways in which a video game play might be modified are described below in conjunction with FIGS. 7-8. In one embodiment, GSB 352 may generally employ processes such as described below in conjunction with FIGS. 5-6 to perform at least some of its actions.

BAPI 353 is configured to perform various analysis from the received biofeedback measures and to provide responses to various queries from GSB 352. In one embodiment, BAPI 353 may collect and store received biofeedback measures in data store 356 to enable data analysis to be performed, auditing over a time period to be performed, historical data to be collected and analyzed, or the like. In one embodiment, BAPI 353 may perform at least some analysis upon the received biofeedback measures substantially in real-time. That is, as soon as the measures are received by BAPI 353, at least some analysis is performed on the measures.

As noted, BAPI 353 may receive biofeedback measures from a variety of different biofeedback sensors, including, but not limited to those described above in conjunction with FIG. 1. In one embodiment, the received measures may be identified as a sensor source, such as a heart rate sensor, a galvanic skin sensor, or the like.

BAPI 353, as stated, may perform analysis on the received measures. For example, BAPI 353 may receive 'raw' biofeedback measures, and determine from the measures a heart beat based on the measures. In another embodiment, BAPI 353 may employ one or more measures to determine other physiological information about an associated game player. For example, BAPI 353 might compute a heart rate variability from heart sensor measures. Similarly, BAPI 353 might compute a standard deviation of heart rate activity over a defined time period, determine a trend over time in a heart rate, and/or determine other heart patterns. BAPI 353 may analyze frequency spectrums of heart rate data, including breaking down beat-to-beat intervals into various frequencies using, for example, Fourier transforms, or similar analysis techniques. BAPI 353 may also employ various measures to determine other physiological information about the game player including, but not limited to respiration rate, relaxation level, fight or flight data, or the like.

BAPI 353 might store the results of the analysis for use during a subsequent game play, or determine and employ the results, virtually in real-time. BAPI 353 may further perform various recalibration activities, including, such as a progressive recalibration activity. In one embodiment, the recalibration activities may be performed on the sensors, and/or to account for physiological changes over time.

Similarly, BAPI 353 may employ historical data based on the biofeedback measures to recognize a particular game player, profiles, or the like, through various mechanisms, including, pattern matching, or the like. BAPI 353 may further recognize when one game player disconnects from the sensors and/or is replaced by another game player, based on such activities as missing and/or corrupt biofeedback measures, pattern changes, or the like.

BAPI 353 may also be configured to detect particular patterns, conditions, or the like from analyzing the received biofeedback measures. For example, in one embodiment, BAPI 353 might detect and/or even predict an onset of motion sickness based, for example, on a causal coherence between a heart rate, blood pressure, and/or other measures. However, BAPI 353 may further detect other situations that may be of a severity that warrants sending of an alert message to the video game player, and/or to GSB 352 to cease game play. However, BAPI 353 is not constrained to these actions, and others may also be performed.

As noted above, BAPI 353 is further configured to make inferences about a state of arousal, emotional states, or the like, of a game player based on analysis of the received biofeedback measures. Such inferences may be performed based on the measures as received, and/or based on historical data about the game player, and/or other game players. GSB 352 may query BAPI 353 for information about one or more game player's state or arousal, and/or other information about the game player(s) based in part on the inferences.

In one embodiment, GSB 352 may send a query request for information about the game player's state of arousal. In response, BAPI 353 may provide a qualitative response, such as "is happy," "is sad," "is stressed," "is lying," or the like. However, in another embodiment, the response may be a quantitative response indicating a level of happiness, such as from zero to ten, or the like. However, the invention is not restricted to these values or even to this example range, and clearly, other values and/or ranges may be used. For example, a quantitative response indicating a level of happiness could also be a letter grade.

In any event, FIG. 6 illustrates one embodiment of non-exhaustive, non-limiting examples of queries that GSB 352 may send to BAPI 353. For example, as illustrated, GSB 352 may send a query seeking to determine if the game player "is frustrated." Similarly, GSB 352 may send a query seeking to determine if the game player is "bored," "relaxed," "zoning" (indicating that the game player is not focused on the game play), or the like. GSB 352 could also query whether the game player is "anticipating" some action. Such information may be based, for example, on skin conductance levels, heart rate measures, or the like.

GSB 352 may also send a query seeking specific biofeedback information, such as "determine heart rate trend," "determine SCL trend" (for skin conductance level), or the like. GSB 352 may further query seeking information about the game player's past status, such as "was player startled," or the like.

As illustrated in FIG. 6, GSB 352 may also send query requests to provide information about the game player as compared to other information. For example, as shown, GSB 352 may query to obtain a comparison between a current state and a previous state of the game player, as well as perform a comparison of the game player to other game players, a baseline, a benchmark, or the like. While FIG. 6 provides numerous examples of possible queries, it should be apparent that other queries may also be performed. Thus, the invention is not constrained to these examples.

In any event, GSB 352 then employs the results of the queries to modify a state of game play in any of a variety of ways. In one embodiment, and as used herein, a result of a query to GSB 352 may then provide a result that may be termed as biofeedback information or a "biocharacteristic." Using such biocharacteristics obtained from biofeedback of the game player is directed towards providing a more immersive experience of game play over traditional game play. For example, the state of the game play may be modified by enabling avatar mimicry of a player's emotional state. For example, if the player is determined to be happy, the player's avatar may be modified to appear happy. Similarly, if the player is determined to be angry, the game state may be modified to present to the player a different set of game play experiences than if the player is determined to be happy.

Further, in at least one embodiment, the biocharacteristics, such as the state of arousal of the game player may be used to modify a characteristic of an input and/or input/output user device. For example, a color of a joystick, a level of resistance on the joystick, or the like, may be modified as a result of a state of arousal of the game player. Similarly, a color of some other input/output user device might vary based on a heart beat rate, change levels of intensity and/or color based on the heart rate, level of stress, boredom, or other biocharacteristic indicating a state of arousal of the game player.

It should be noted that while GSB 352 and BAPI 353 are illustrated as residing in a network device remote from the client device (such as client device 101 of FIG. 1), the invention is not so constrained. Thus, in another embodiment GSB 352 and/or BAPI 353 may reside in the client device, a plurality of different client devices, and/or across one or more different network devices. Similarly, BAPI 353 may reside within GSB 352, without departing from the scope of the invention.

Generalized Operation

Figure 4:
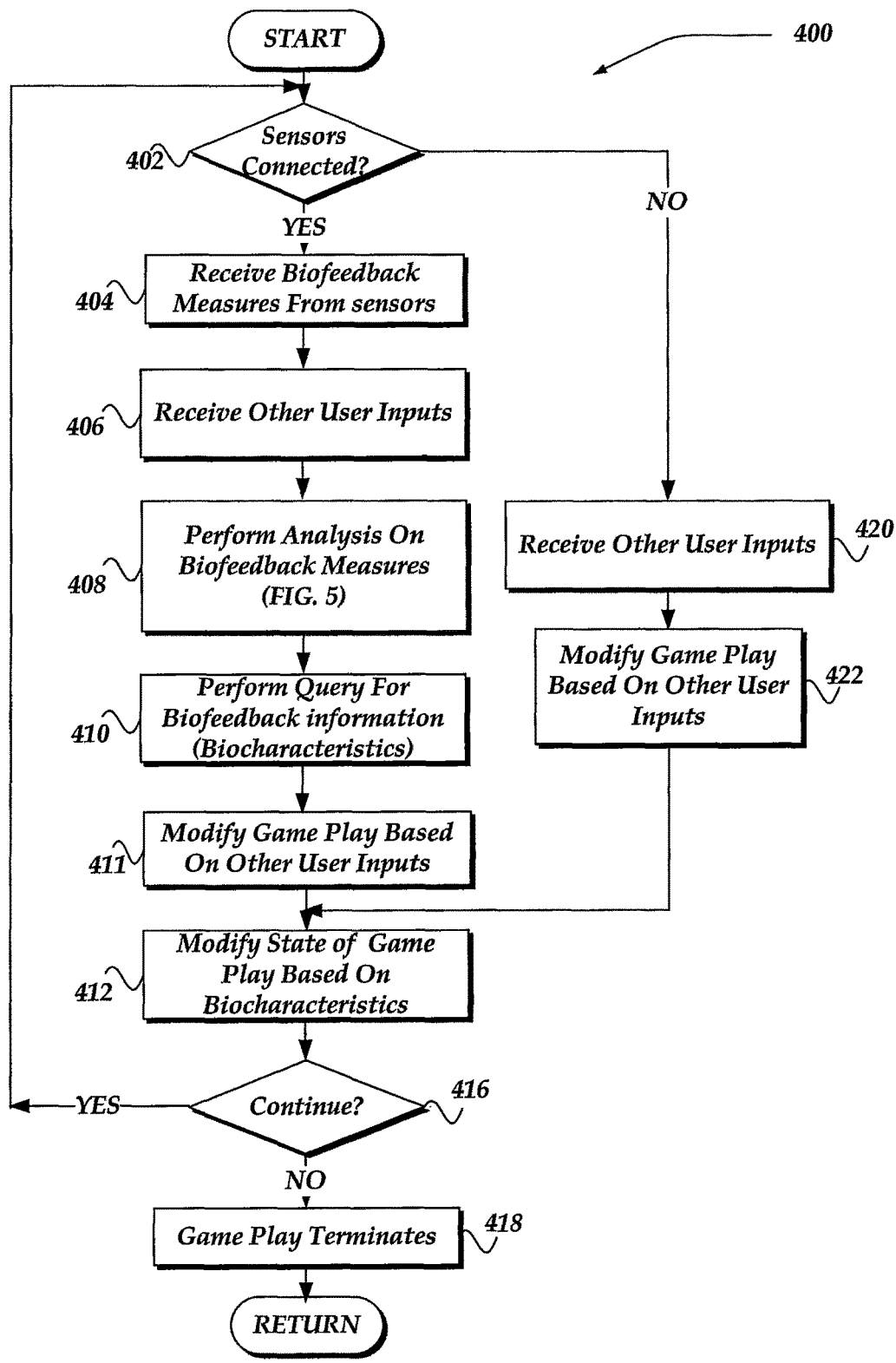
FIG. 4 illustrates a flow chart for one embodiment of a process of employing biofeedback measurements from a game player to modify a game play state in a video game.

The operation of certain aspects of the invention will now be described with respect to FIGS. 4-5 and 7-8. FIG. 4 illustrates allow chart for one embodiment of a process of employing biofeedback measurements from a game player to modify a game play state in a video game. In one embodiment, process 400 of FIG. 4 may be implemented with a combination of GSB 352 and BAPI 353 of FIG. 3.

Process 400 of FIG. 4 begins, after a start block, at decision block 402, where a determination is made whether biofeedback sensors are connected. Such determination may be based on a flag, switch, or the like received from a client device, a gamer server application, or the like. In another embodiment, a determination may be made based on receiving biofeedback measures from one or more biofeedback sensors, where the measures are determined to be within an expected range. For example, where measures are received for a heart rate sensor that appears to indicate background noise measurements, it may be determined that the sensor is either faulty and/or otherwise not connected, or the like. In any event, if it is determined that biofeedback sensors are not connected for the purpose of modifying a state of a game play, processing flows to block 420; otherwise, processing flows to block 404.

At block 420, other user inputs are received. Such other user inputs may include, but are not limited to joystick, game controller, keyboard, mouse inputs, audio inputs, or the like. Such inputs are typically considered a result of a voluntary or conscious action on the part of the game player, as opposed to biofeedback measure inputs. Processing then continues to block 422, where the state of game play is modified based on such other user inputs. Processing then flows to decision block 416, where a determination is made whether the game play is to continue. If game play is to continue, processing loops back to decision block 402; otherwise, processing flows to block 418, where game play terminates. Processing then returns to a calling process to perform other actions.

Alternatively, if at decision block 402, biofeedback sensors are determined to be connected, processing flows to block 404, where biofeedback measures are received from one or more biofeedback sensors. In one embodiment, receiving the biofeedback sensors includes performing a quality analysis upon the measures, time stamping the measures, identifying a biofeedback sensor source, or the like. Moreover, receiving such biofeedback measures may include sending the measures over a network to a biofeedback API, such as described above. Processing then flows to block 406, where other user inputs are received, including voluntary or conscious user inputs as described in conjunction with block 420. It should be noted that blocks 406 and 408 may occur in a different order, or even be performed concurrently.

Processing then continues to block 408, which is described in more detail below in conjunction with FIG. 5. Briefly, however, analysis is performed on the biofeedback measures to generate historical data, and/or perform other analysis to determine a state of arousal or other biocharacteristics of the game player. In one embodiment, block 408 may be performed substantially in real-time, as the biofeedback measures are received.

Processing continues to block 410, where a query may be performed before, during, and/or after by the game application (or other interactive application). Such queries may include, but are not limited to those described above in conjunction with FIG. 6.

Continuing next to block 411, the state of game play is modified based on such other user inputs as joystick inputs, game controller inputs, keyboard inputs, audio inputs, mouse inputs, or the like. Processing then flows to block 412, based on a result of the query to obtain a biocharacteristic of a game player, a state of the game play may be modified. Examples of modifying a game play state includes, but are not limited to modifying a type and/or number of opponents in a game; modifying a pace or tempo of the game; increasing/decreasing a time limit for a game event; modifying a combat, puzzle, or other challenge degree of difficulty; modifying an availability of supplies, power-up items, and or other aspects of items in the game; modifying a volume and/or type of sound, music, and/or other audio feature; modifying a color, or other aspect of the game, including a background feature of the game; modifying lighting, weather effects, and/or other environmental aspects within the game; modify a dialog of various characters within the game including possibly modifying an avatar representing the game player; providing or inhibiting game hints, suggestions, modifying an appearance or function of an application, or the like. For example, in one embodiment a user interface may be modified based on various biocharacteristics. Similarly, tutorials, instructions, or the like, may also be modified by skipping, slowing down/speeding up a rate of presentation, or the like. It should be apparent to one of ordinary skill in the art, that other ways of modifying a game state may be employed based on the resulting biocharacteristics from the query. Processing then continues to decision block 416, where a determination is made whether to continue game play, as described above.

Figure 5:
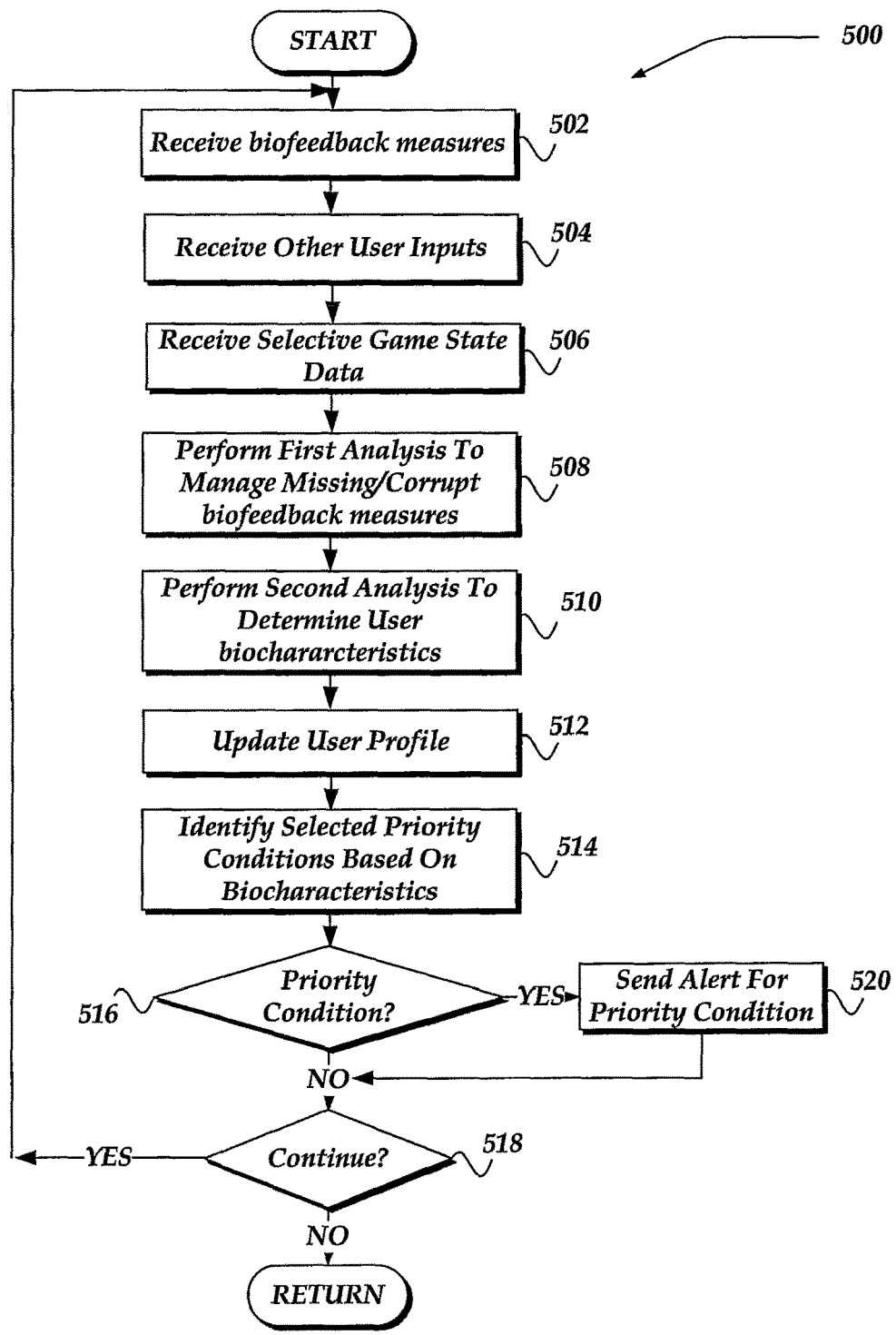
FIG. 5 illustrates a flow chart for one embodiment of a process of performing an analysis of biofeedback measures from a game player for use in the video game.

FIG. 5 illustrates a flow chart for one embodiment of a process of performing an analysis of biofeedback measures from a game player for use in the video game. Process 500 of FIG. 5 may be implemented, in one embodiment, within BAPI 353 of FIG. 3.

Process 500 begins, after a start block, at block 502, where biofeedback measures are received. Continuing to block 504, other user inputs, such as voluntary or conscious user inputs are received. In at least one embodiment, analysis of the biofeedback measures may employ or be complemented by information obtained from voluntary or conscious user inputs. For example, where a user is typing into a keyboard a particular command, text, or the like, the text or command may be used to complement an interpretation of a heart rate variability, or the like. Similarly, flowing to block 506, other game state data may be selectively received and employed to further assist in an analysis of the biofeedback measures. For example, such game state data might indicate that the game is presenting to the game player an extremely difficult challenge, or the like. The heart rate measures might, however, be determined to be that of a typical adult male at rest.

Flowing to block 508, therefore, a first analysis may be performed on the received biofeedback measures to determine whether there are missing and/or corrupt data. In one embodiment, such determination might indicate that a biofeedback sensor is faulty, or that a game player has moved the sensor, or the like. In one embodiment, where the measures are determined to be corrupt or otherwise faulty for a first time period, but found to be non-corrupt or faulty during a second time period, then an interpolation might be performed to 'smooth' the received measures. In another embodiment, the sensor associated with the corrupt/faulty measures might be marked or otherwise identified as corrupt. In which instance, in one embodiment, the measures from the marked sensor may be ignored. In still another embodiment, recent, historically known to be good data may be used to replace data determined to be corrupt/faulty, missing, or the like, to 'bridge' a time period during, for example, sensor re-adjustment, and/or other perturbances of the data.

Processing then flows to block 510, where a second analysis is performed on the received biofeedback measures using, in part, the other received data, to determine a state of arousal and/or other biocharacteristics of the game player. Using the combination of information during block 510 it may be determined that the game player is bored, zoning, or the like. In any event, it should be noted that blocks 502, 504, 506 and 508 might be performed in another order, or even concurrently.

A described herein, a variety of mechanisms may be used to infer a biocharacteristic, and/or other physiological characteristics of the game player, including performing statistical analysis, pattern matching, or the like. In one embodiment, historical information about one or more game players may be used to assist in performing the analysis to infer various biocharacteristics of the game player, including a state of arousal of the game player.

Processing then flows to block 512, where, in one embodiment, at least some of the inferences, measures, and/or other data, may be used to update a user profile. Processing then flows to block 514, where selected priority conditions based on the inferences, biofeedback measures, and/or other data may be identified. For example, in one embodiment, where it might be determined that a game player's measures are useable to infer that the game player is feeling ill, such condition might be identified for further actions. Thus, processing flows next to decision block 516, where a determination is made whether any such priority conditions are identified. If so, processing flows to block 520, where an alert may be sent to the game player, an administrator, or the like. In one embodiment, the game play might be terminated. Processing then flows to decision block 518.

If however, no priority condition is identified, processing flows to decision block 518, where a determination is made to continue performing analysis on the received biofeedback measures. If so, processing loops back to block 502; otherwise, processing may return to a calling process.

There following describes a couple of possible use cases describing use of biofeedback measures to modify a state of a game play. It should be noted, however, that the invention is not constrained to these use cases, and others may also be employed.

As noted above, FIG. 6 illustrates one embodiment of a non-exhaustive, non-limiting example of queries for use in querying a biofeedback application programming interface (API) for biofeedback measures. It should be noted that the invention is not limited to these query examples illustrated in FIG. 6, and others may also be employed. However, as shown, a variety of different queries may be performed that include, but is not limited to determining a player's arousal level and/or emotional level. In one embodiment, specific queries regarding arousal might include, is the player "happy," "sad," "frustrated," "energized," "engaged" (in the game play), "bored," "relaxed," or even "zoning." Queries may also be performed regarding whether the player is determined to be anticipating some action, is startled, was startled, or the like. Similarly, specific biofeedback may be obtained that includes, for example, heart rate trend, an SCL trend, or some other signal trend. In embodiment, a time period may be provided with the query over which the trend is to determined.

The queries are not limited to these examples, and other queries might include, comparing information about the player, and/or another player. In one embodiment, an arbitrary query might be generated. For example, a particular formula, equation, combination of biofeedback measures, or the like, may be submitted.

Figure 7:
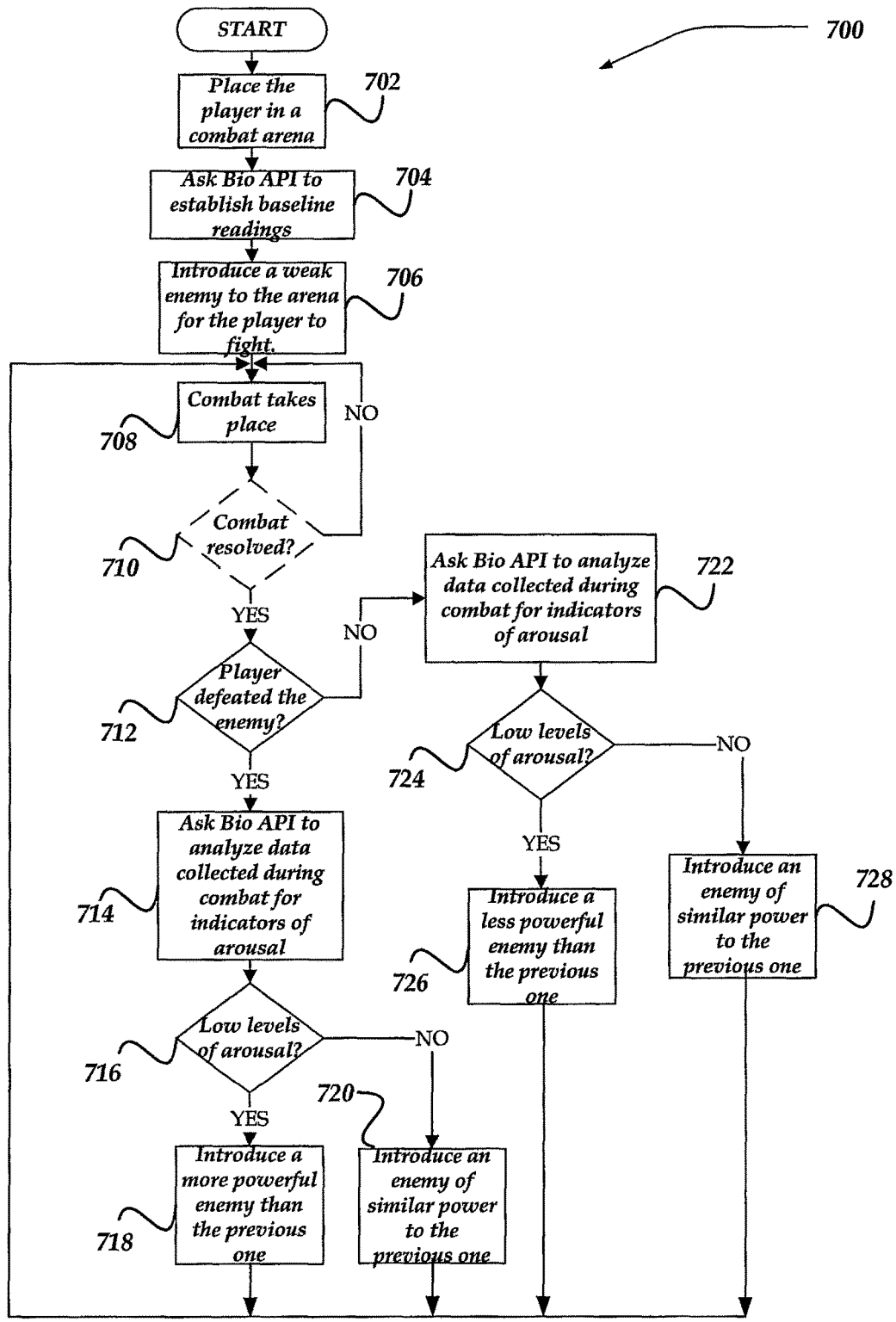
FIG. 7 illustrates one embodiment of a non-exhaustive non-limiting example of using biofeedback measures for use in modifying a game play state in an arena combat video game.

FIG. 7 illustrates one embodiment of a non-exhaustive non-limiting example of using biofeedback measures for use in modifying a game play state in an arena combat video game.

As illustrated, process 700 of FIG. 7 begins, after a start block, at block 702, where a computer game that is configured to provide a combat scenario is executed. Execution of the computer game places the player in a combat arena. That is, in one embodiment, an avatar, or mechanism may be employed to represent the player within the computer game. The player is employing one or more biofeedback sensors, such as those described above.

Thus, processing flows to block 704, where a request may be made during the computer game to request that the BAPI establish a baseline of readings of biofeedback measures for the player. In one embodiment, the biofeedback measures may include a heart rate baseline, a skin conductance level, or other biofeedback measures that may then be analyzed to determine a baseline state of arousal or biocharacteristic for the player.

Processing then proceeds to block 706, where an enemy is introduced into the arena for combat with the player. In one embodiment, the selection of the enemy is based on the determined baseline state of arousal. In one embodiment, the baseline may be used to detect whether this player is associated with a user profile indicating that the player has played this game or a similar game before. Based on the user profile, the enemy may also be selected at a level determined to sufficiently challenge the player without boring, or frustrating the player.

Processing moves next to block 708, where the combat is played out between the player and the provided game enemy. As the combat is played out, various biofeedback measures are collected, recorded, and/or analyzed.

In one embodiment, processing then flows to decision block 710, where a determination is made whether the combat is resolved. That is, has the player or the game enemy won? If the combat is resolved, processing may flow to decision block 712; otherwise, processing may loop back to block 708.

At decision block 712, a determination can be made whether the player defeated the game enemy. If so, processing flows to block 714; otherwise, processing flows to block 722.

It should be noted, that in another embodiment, decision block 710 might be removed, such that a determination can be made during the same combat. That is, decision block 712 might be modified, with decision block 710 removed, such that a determination is made whether the player is defeating or winning against the game enemy. In this manner, changes to the game state may dynamically modify a same game combat.

In any event, at block 722, a query may be provided to the BAPI to analyze the biofeedback measures obtained during the combat of block 708. In one embodiment, the analysis may include a comparison of the state of arousal during block 708 to the state of arousal determined from the baseline for the player from block 704.

Processing then flows to decision block 724, where a determination is made whether the player had a low state of arousal during the combat. Such determination may be based on whether the difference from the comparison at block 722 is above a defined threshold value. In another embodiment, a statistical analysis may be performed to determine whether within some confidence level, the player is determined to be significantly aroused statistically. In any event, if the player is determined to be aroused, processing flow to block 728, where another enemy might be introduced to the game that has a similar level of power, or difficulty as the previous enemy. Processing then flows back to block 708.

If, however, the state of arousal is determined not to be statistically significant, or is below some threshold value, then processing flows to block 726, where a less powerful enemy than the previous enemy is introduced. Processing then flows back to block 708.

If, however, at decision block 712, it is determined that the player is defeated or is being defeated, processing flows to block 714, where a query is performed substantially similar to block 722. Continuing, at decision block 716, a determination is made whether the player state of arousal is low, substantially similar to the determination of decision block 724. If the state of arousal is low, processing flows to 718; otherwise, processing flows to block 720.

At block 718, a more powerful enemy than the previous enemy is introduced. Processing then loops back to block 708. At block 720, an enemy having similar power to the previous enemy may be introduced. Processing also then loops back to block 708. Clearly, where process. 700 is modified to make dynamic modifications of the power of the enemy while the same combat is being waged, substitution of the enemy may take several forms, including, for example, merely enhancing or removing some power from the current enemy; introducing and/or removing additional enemies, or the like.

Figure 8:
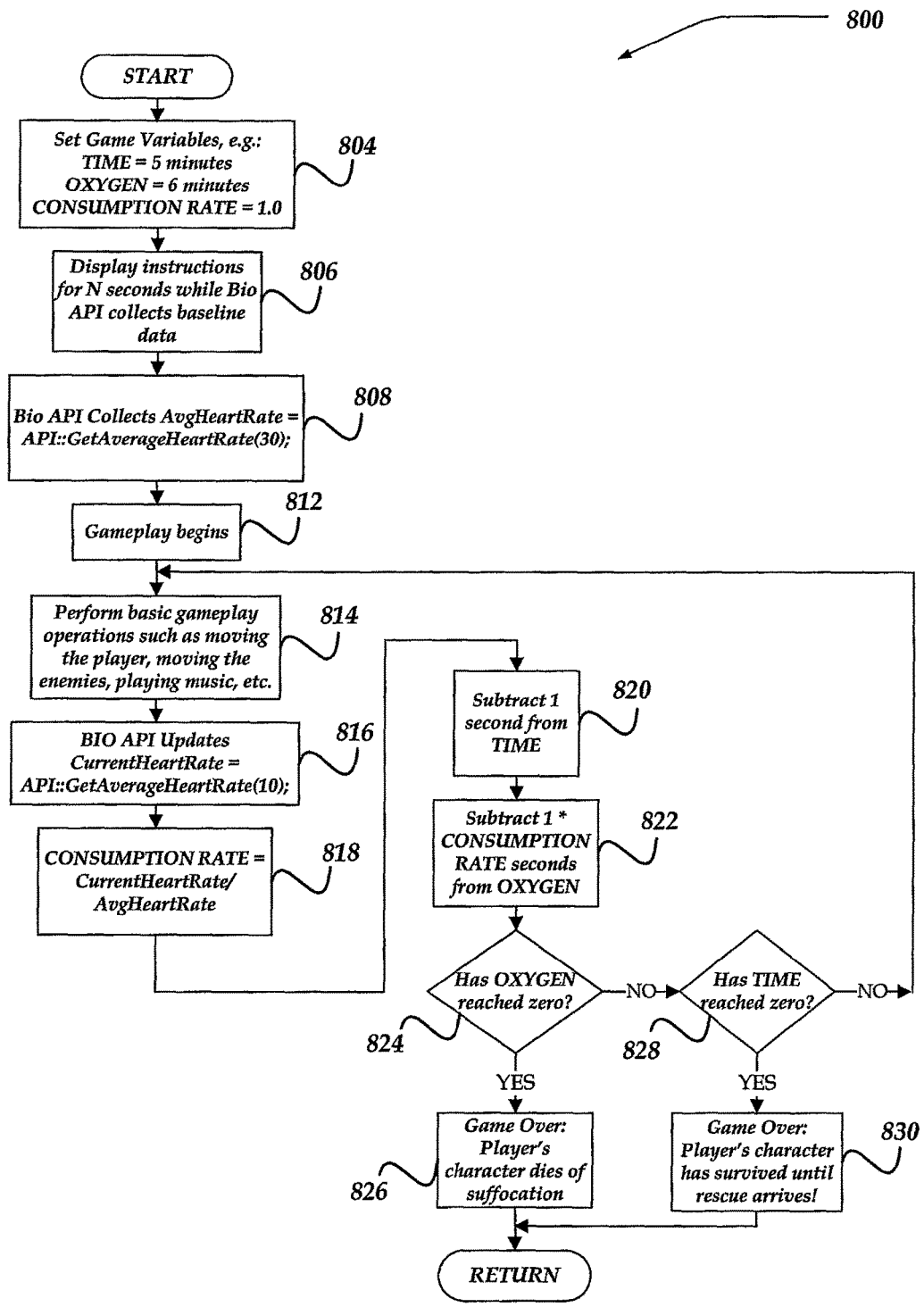
FIG. 8 illustrates one embodiment of a non-exhaustive non-limiting example of using biofeedback measures for use in modifying a game play state in a space video game.

FIG. 8 illustrates another embodiment of another non-exhaustive non-limiting example of using biofeedback measures for use in modifying a game play state. In process 800 of FIG. 8, the game illustrated is a space video game. In this example game, the player is challenged to attempt to conserve an amount of oxygen by attempting to control their consumption of air. For example, the game may introduce the player to a situation where they are to be rescued in a given time period, such as five minutes. However, the player's spacesuit contains six minutes worth of oxygen, if consumed at a predefined "regular" rate of consumption of say, one unit of oxygen per second. The player is then introduced to various situations that may be modified based on the player's biofeedback measures. Thus, in one embodiment, the game state could be modified to make the game more complex or less complex, introducing more activities or decreasing a number of activities the player need perform based on the player's biofeedback measures. During the game play, the player is further expected to manage their oxygen consumption. Thus, the player is challenged to control their air consumption, in one embodiment, by trying to maintain a reduced level of physiological arousal—which may be associated with the consumption of oxygen by the video game avatar—while dealing with various stressful tasks within the video game, such as combat against an enemy, solving a puzzle, or other problem, or the like.

As shown, in this example, then, process 800 begins, after a start block, at block 804, where various game variables may be set, including, for example, a time for the game, an oxygen level, a consumption rate, and the like. Flowing next to block 806, instructions, or similar information, or the like, may be displayed to the player. During display of the instructions, or the like, various biofeedback measures may be received and analyzed to determine a baseline for the player. For example, in one embodiment, the biofeedback measures may include a heart rate measure for the player.

Processing continues to block 808, where the BAPI may be queried to determine an average heart rate for the player over some period of time. As shown in FIG. 8, one period of time is 30 seconds. However, as should be apparent, the game time periods, as well as other parameters, are merely for illustration, and other values may be used. In any event, the result of the query may then be used as a baseline heart rate.

Processing next flows to block 812, where the game play may begin. Continuing to block 814, the player is introduced to various game states of play that may include having the player move, perform combat, play music, and/or otherwise repair items, talk to other players, or the like. Flowing to block 816, during the game play, the game performs additional query requests to collect additional heart rate measures. An average heart rate may then be determined over some period of time, such as a most recent ten second of game play. Continuing to block 818, a consumption rate of oxygen may be further determined based, for example, on a rate at which the player is determined to consume oxygen, based on the biofeedback measures. In one embodiment, the oxygen consumption may be derived or otherwise inferred from a ratio of the player's current heart rate to the average baseline heart rate for the player.

Continuing to block 820, the time for the game play is decremented. Continuing to block 822, an amount of oxygen remaining is determined based on the determined consumption rate of the player. Moving to decision block 824, a determination may be made whether there is any more oxygen remaining. If so, processing flows to decision block 828; otherwise, processing flows to block 826.

At block 826, it is determined that the player's character has run out of oxygen, and therefore has died of suffocation. The game may then terminate and return to a calling process. Alternatively, at decision block 828, a determination is made whether the time remaining in the game is zero. If so, then the game is determined to be over, and the player's character is determined to have survived, at block 830. Processing then returns. However, if there is still more time, processing loops back to block 814 to continue to the game.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

As can be seen from the above game examples, biofeedback measures may be used in a variety of ways to modify a state of a game play. However, the variations are not limited to those described above. For example, in variation to the above games, the biofeedback measures may be used to control an input to the game. For instance, if a large creature is hunting the game player's character, then the player might be expected to maintain or reduce their stress level to avoid alerting the creature of their positions. In a similar game, the player might be required to demonstrate sharp physiological arousal to break out of handcuffs or other restraints or break through a locked door to escape a threat.

In another game scenario, little elf characters that give cookies to the user might only appear when the player is calm, and stay away if the user is not determined to be calm. A player desiring the cookies (or other reward) must achieve a state of calmness to attract the characters. In still another game scenario, in a forest adventure, it may be sunny with lush, green trees, when the player is determined to be in a particular physiological state of arousal. As the player deviates from that state, the sky might darken, the trees may wither and/or blacken, and/or various colors, music, and/or other sounds may change. Thus, various background aspects within the game may be dynamically modified based on the biofeedback measures of the player.

Similarly, based on biofeedback measures from the player, various non-player characters may make dialog choices, vary their display or the like, including commenting directly on the user's inferred state of arousal or other bio characteristic.

In still other examples, a user's avatar might show a visible heart, brain, or other bodily aspect, which may be modified based on the biofeedback measures. For example, the heart might change color to show boredom, anger, happiness, or the like. Similarly, the heart might beat to coincide with the heart rate of the player. In still another embodiment, the heart rate of the avatar might be modified to be slightly slower than the heart rate of the player—to attempt to direct the player to become calm. The avatar's facial expressions may also vary as a result of the inferred player's state of arousal, including showing a smile, a frown, anger, or the like.

In addition, a user interface device, screen display or the like, might be modified based on the players' inferred state of arousal. Thus, if it determined that the player is stressed, the user interface might display a help feature to guide the player to a solution for a problem in the game play they are experiencing. There are still a plurality of other ways in which the biofeedback measures may modify a state of game play. Thus, as noted, the invention is not limited to those described above.

However, the above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A video game device, comprising:
   one or more physical biofeedback sensors;
   a processor; and
   memory in communication with the processor useable in storing data and machine instructions that causes the processor to perform actions, including:
      receiving, from the one or more physical biofeedback sensors associated with a particular video game player, biofeedback measures while the particular video game player is participating in a current video game play of a video game that displays a user interface with information for the video game on one or more displays and that provides functionality for the video game to the particular video game player;
      identifying the particular video game player the current video game play, and determining that the particular game player has played before and is associated with a prior user profile, wherein the user profile includes stored historical biofeedback measures about the particular video game player from a prior video game play;
      analyzing the received biofeedback measures together with the historical biofeedback measures to make at least one inference about a physiological condition of the particular video game player;
      updating the user profile with the received biofeedback measures or the at least one inference;
      generating a minimum threshold for the physiological condition for the particular video game player and a maximum threshold for the physiological condition for the particular video game player, wherein the minimum threshold and the maximum threshold are based on at least one of historical biofeedback measures for the particular video game player, the current video game play for the particular video game player, or statistics for a plurality of video game players; and
      modifying a state of the current video game play based on the inferred physiological condition of the particular video game player and the minimum threshold or the maximum threshold, including modifying the displayed user interface and modifying the functionality provided for the video game.

2. The video game device of claim 1, wherein the biofeedback measures includes at least one of a heart rate, a heart rate variability, a blood oxygen level, a skin conductance level, a respiration rate, a skin tension, a voice stress level, a blood pressure, facial expressions, body temperature, pupil dilation, an eye movement, gestural motion, an Electroencephalography (EEG) or other neural imaging measure, or an Electromyography (EMG) measure.

3. The video game device of claim 1, wherein the physiological condition inferred involves stress of the particular video game player reaching a defined threshold.

4. The video game device of claim 1 wherein the physiological condition is at least one of motion sickness, anxiety, boredom, anger, or frustration.

5. The video game device of claim 3, wherein modifying the state of the current video game play further includes at least one of sending an alert message or ceasing game play.

6. A method operating within a computer device, comprising:
   providing a current play of an interactive application to a player, including displaying, to the player, a user interface with information for the interactive application on one or more displays;
   receiving, from one or more physical biofeedback sensors, a plurality of biofeedback measures for the player;
   analyzing the biofeedback measures to infer at least one physiological condition of the player for the current play and determining that the player has played before and is associated with a prior user profile, wherein the user profile comprises stored historical biofeedback measures about the player from prior play of the interactive application;
   generating a minimum threshold for the at least one physiological condition for the player and a maximum threshold for the physiological condition for the player, wherein the minimum threshold and the maximum threshold are based on at least one of historical biofeedback measures for the player, current video game play for the player, or statistics for a plurality of players;

updating the user profile with the at least one physiological condition or the plurality of biofeedback measures; and modifying a state of play of the interactive application based at least one of the minimum threshold or the maximum threshold being met by using the determined at least one physiological condition, including modifying the displayed user interface for the interactive application.

7. The method of claim 6, wherein the biofeedback measures includes at least one of a heart rate, a heart rate variability, a blood oxygen level, a skin conductance level, a respiration rate, a skin tension, a voice stress level, a blood pressure, facial expressions, body temperature, pupil dilation, an eye movement, gestural motion, an Electroencephalography (EEG) or other neural imaging measure, or an Electromyography (EMG) measure.

8. The method of claim 6, wherein the physiological condition inferred involves stress of the player that reaches a defined threshold.

9. The method of claim 8, wherein the physiological condition is at least one of motion sickness, anxiety, boredom, anger, or frustration.

10. The method of claim 6 wherein modifying the state of play further includes sending an alert message.

11. The method of claim 6 wherein the interactive application is a video game, wherein the providing of the current play of the interactive application further includes providing functionality for the video game to the player, and wherein the modifying of the state of play further includes ceasing game play.

12. The method of claim 6 wherein the providing of the current play of the interactive application further includes providing functionality to the player, and wherein the method further comprises using one or more of the received plurality of biofeedback measures to determine that one or more hardware sensors used to obtain at least one of the received plurality of biofeedback measures is providing faulty readings, and modifying the functionality provided to the player in response to the faulty readings.

13. The method of claim 6 wherein the providing of the current play of the interactive application further includes providing functionality to the player, and wherein the method further comprises using one or more of the received plurality of biofeedback measures to determine that a current player has changed from the player, and modifying the provided functionality in response to determining that the current player has changed.

14. The method of claim 6 wherein the receiving of the plurality of biofeedback measures includes receiving and analyzing data for the player from at least one of eyeglasses, a wrist band, a finger sensor attachment, a sensor within a computer mouse, a sensor within a video game controller device, or a microphone.

15. The method of claim 6 wherein the receiving of the plurality of biofeedback measures includes at least one of receiving and analyzing one or more images of the player from one or more video cameras, or receiving and analyzing data from one or more sensor pads on which the player stands to determine at least one of weight or position of the player.

16. The method of claim 6 wherein the receiving of the plurality of biofeedback measures includes receiving and analyzing data to assess, for the player, at least one of heart rate, galvanic skin response, body temperature, movement of one or more body parts, blood oxygen level, respiration rate, blood pressure, or voice stress level.

17. The video game device of claim 1 wherein the causing of the processor to perform actions further includes using one or more of the received biofeedback measures to determine that one or more hardware sensors used to obtain at least one of the received biofeedback measures is providing faulty readings, and modifying the functionality provided to the particular video game player in response to the faulty readings.

18. The video game device of claim 1 wherein the causing of the processor to perform actions further includes using one or more of the received biofeedback measures to determine that a current player has changed from the particular video game player, and modifying the provided functionality in response to determining that the current player has changed.

19. The video game device of claim 1 wherein the receiving of the biofeedback measures includes receiving and analyzing data for the particular video game player from at least one of eyeglasses, a wrist band, a finger sensor attachment, a sensor within a computer mouse, a sensor within a video game controller device, a microphone, a video camera, or one or more position sensor pads on which the particular video game player stands.

20. The video game device of claim 1 wherein the receiving of the biofeedback measures includes receiving and analyzing data to assess, for the particular video game player, at least one of heart rate, galvanic skin response, body temperature, movement of one or more body parts, blood oxygen level, respiration rate, blood pressure, or voice stress level.

21. A video game device, comprising:
one or more physical biofeedback sensors;
a processor; and
memory in communication with the processor useable in storing data and machine instructions that causes the processor to perform actions, the actions including:
receiving, from the one or more physical biofeedback sensors, biofeedback measures for the video game player while the video game player is playing a video game that provides a user interface that provides functionality for the video game;
analyzing the received biofeedback measures to make at least one inference about the state of arousal of the video game player;
generating a minimum threshold for the state of arousal for the particular video game player and a maximum threshold for the state of arousal for the video game player based on at least one of: historical biofeedback measures for the video game player, the current video game play for the video game player, or historical biofeedback measures for a plurality of video game players;
comparing the inferred state of arousal of the video game player to the minimum threshold or the maximum threshold; and
modifying the user interface based on the comparison between the inferred state of arousal and the minimum threshold or the maximum threshold, wherein modifying the user interface comprises modifying the user interface to dynamically adjust presentation of a game play instruction or a tutorial by skipping, slowing down, or speeding up the presentation of the game play instruction or tutorial responsive to the comparison of the state of arousal of the video game player to the minimum threshold or the maximum threshold.

22. The video game device of claim 21 wherein modifying the user interface comprises modifying an output of a display of the user interface based on the comparison between the inferred state of arousal and the minimum threshold or the maximum threshold.

23. The video game device of claim 21 wherein the one or more physical biofeedback sensors comprises a video camera.

24. The video game device of claim 23 wherein, in operation, the video camera captures a biofeedback measure comprising at least one of heart rate, heart rate variability, respiration rate, voice stress level, facial expression, body temperature, pupil dilation, eye movement, gestural motion, head movement, or body movement.

25. The video game device of claim 21 wherein the one or more physical biofeedback sensors comprises a head worn device that measures a biofeedback measure comprising at least one of heart rate, heart rate variability, blood oxygen level, skin conductance level, respiration rate, skin tension, voice stress level, blood pressure, facial expression, body temperature, pupil dilation, eye movement, gestural motion, head movement, body movement, an electroencephalography (EEG) or other neural imaging measure, or an electromyography (EMG) measure.

26. The video game device of claim 21 wherein modifying the user interface comprises modifying the user interface to provide an opportunity for the video game player to relax or recover responsive to determining that the state of arousal is above the maximum threshold.

27. The video game device of claim 21 wherein modifying the user interface comprises modifying the user interface to provide an increased level of excitement for the video game player responsive to determining that the state of arousal is below the minimum threshold.

28. The video game device of claim 21 wherein at least one of the minimum threshold or the maximum threshold is based on statistical analysis of historical biofeedback measures for the video game player or a plurality of game players.

29. The video game device of claim 21 wherein the video game is a multi-player video game, and the actions further include:

obtaining biofeedback measures from other game players; and further modifying the user interface based on the obtained biofeedback measures from the other game players.

30. The video game device of claim 21 wherein modifying the user interface comprises modifying the user interface to dynamically adjust a difficulty of the video game responsive to the comparison of the state of arousal of the video game player to the minimum threshold or the maximum threshold.

31. The video game device of claim 21 wherein modifying the user interface comprises modifying the user interface to dynamically adjust an emotional or physiological state of a game character displayed by a display of the user interface responsive to the comparison of the state of arousal of the video game player to the minimum threshold or the maximum threshold.

32. The video game device of claim 21 wherein the actions further include dynamically modifying a characteristic of an user input device operated by the game player responsive to the comparison of the state of arousal of the video game player to the minimum threshold or the maximum threshold.

33. The video game device of claim 21 wherein modifying the user interface comprises at least one of: modifying a type or number of opponents in the video game, modifying a pace or tempo of the video game, increasing or decreasing a time limit for a game event of the video game, modifying a degree of difficulty of a challenge of the video game, modifying an availability of supplies or power-up items in the video game, modifying an audio feature of the video game, modifying a video feature of the video game, modifying an environmental aspect within the video game, modifying a dialog of a character within the video game, or providing or inhibiting hints or suggestions for the video game.

34. The video game device of claim 21 wherein modifying the user interface comprises dynamically modifying the game state to challenge or entice the game player to maintain a reduced level of arousal.

* * * * *